(12) United States Patent
Smith

(10) Patent No.: US 8,513,337 B2
(45) Date of Patent: Aug. 20, 2013

(54) ASPHALT-BASED REACTIVE HOT MELT POLYURETHANE ADHESIVE

(75) Inventor: Jason Smith, Strongsville, OH (US)

(73) Assignee: The Garland Company, Inc., Cleveland, OH (US)

( * ) Notice: Subject to any disclaimer, the term of this patent is extended or adjusted under 35 U.S.C. 154(b) by 630 days.

(21) Appl. No.: 12/470,912

(22) Filed: May 22, 2009

(65) Prior Publication Data

US 2009/0294032 A1    Dec. 3, 2009

Related U.S. Application Data

(60) Provisional application No. 61/057,961, filed on Jun. 2, 2008.

(51) Int. Cl.
*C08L 95/00*     (2006.01)

(52) U.S. Cl.
USPC .............................................. 524/66; 524/59

(58) Field of Classification Search
USPC ..................................... 524/59, 66
See application file for complete search history.

(56) References Cited

U.S. PATENT DOCUMENTS

| | | | |
|---|---|---|---|
| 3,625,804 A | 12/1971 | Losey et al. | |
| 3,880,789 A | 4/1975 | Ishihara et al. | |
| 3,980,597 A | 9/1976 | Shihadeh | |
| 5,319,008 A | 6/1994 | Janoski | |
| 5,421,876 A | 6/1995 | Janoski | |
| 5,866,656 A | 2/1999 | Hung | |
| 5,981,010 A | 11/1999 | Terry et al. | |
| 6,579,924 B2 | 6/2003 | Georgeau et al. | |
| 6,613,836 B2 | 9/2003 | Rumack | |
| 6,679,018 B2 | 1/2004 | Georgeau et al. | |
| 6,742,313 B2 | 6/2004 | Ritland et al. | |
| 7,101,598 B2 | 9/2006 | Hubbard | |
| 7,317,051 B2 | 1/2008 | Georgeau et al. | |
| 2001/0051676 A1 | 12/2001 | Rajalingam et al. | |
| 2006/0089432 A1 | 4/2006 | Kawakami et al. | |
| 2008/0182925 A1* | 7/2008 | Wang et al. | 524/66 |

FOREIGN PATENT DOCUMENTS

| | | |
|---|---|---|
| EP | 1462500 | 3/2003 |
| JP | 2004-161889 | 6/2004 |
| WO | WO 00/37534 | 6/2000 |

* cited by examiner

*Primary Examiner* — Peter Szekely
(74) *Attorney, Agent, or Firm* — Fay Sharpe LLP

(57) ABSTRACT

A novel hot melt adhesive that includes a blend of hot melt polyurethane and petroleum liquid.

12 Claims, No Drawings

ASPHALT-BASED REACTIVE HOT MELT POLYURETHANE ADHESIVE

The present invention claims priority on U.S. Provisional Patent Application Ser. No. 61/057,961 filed Jun. 2, 2008, which is incorporated herein by reference.

The present invention is directed to the production of a reactive polyurethane hot melt that is blended with asphalt, bitumen, modified bitumen, and/or coal-tar, which then can be used as an interply adhesive.

BACKGROUND OF THE INVENTION

Despite their waterproofing properties, regular "hot mopped" roofing asphalts used by roofing contractors are typically brittle and cool very quickly. If the contractor does not unroll a roof membrane and apply the roof membrane to the hot asphalt within about 2-5 seconds after applying the hot asphalt to the roof surface, the asphalt will cool and thus will not properly adhere to the underside of the membrane when the membrane is place over the cooled asphalt. Areas of the underside of the membrane that do not properly adhere to the asphalt are prone to delaminating and/or blistering over time.

In view of the deficiencies associated with the use of hot mopped asphalt as an interply adhesive for roof membranes, there is a need for a improved or modified material that can be used to overcome the past problems with the use of "hot mopped" asphalt.

SUMMARY OF THE INVENTION

The present invention is directed to roof membrane adhesion products, more particularly to hot melt asphalt, modified asphalt, bitumen, modified bitumen, coal-tar, and/or modified coal tar products that are used to adhere roof membrane plies to one another and/or to a roof deck of a building or other type of structure, and even more particularly to hot melt asphalt, modified asphalt, bitumen, modified bitumen, coal-tar, and/or modified coal tar products that are blended with a polyurethane material to form a reactive polyurethane hot melt material that can be used to adhere roof membrane plies to one another and/or to a roof deck of a building or other type of structure.

Because asphalt, modified asphalt, bitumen, modified bitumen, coal-tar, and/or modified coal tar products have the ability to take on the properties of the rubber blended into it, an asphalt-based reactive hot melt polyurethane adhesive blend, a modified asphalt-based reactive hot melt polyurethane adhesive blend, a bitumen-based reactive hot melt polyurethane adhesive blend, a modified bitumen-based reactive hot melt polyurethane adhesive blend, a coal tar-based reactive hot melt polyurethane adhesive blend, and/or a modified coal tar-based reactive hot melt polyurethane adhesive blend can be formed that has water repellant properties of asphalt, modified asphalt, bitumen, modified bitumen, coal-tar, and/or modified coal tar while having additional bonding strength that can be at least partially associated with the polyurethane. Such a novel blend can be tailor-made so as to increase the time period an installer can lay a roof membrane on the blend and still create a strong bond between the roof surface, the blend and the roof membrane. As such, an installer would not have to hurry and apply a ply of roof membrane (e.g., modified bitumen membrane, etc.) on the roof after the hot-melt blend of the present invention is applied to the surface of the roof.

In addition to or alternative to extending the time period for applying a roof membrane on the blend, the blend of the present invention can be formulated to enhance the adhesive properties of the blend by including tackifying resins and/or other additives in the blend to impart a tape-like tack that can act as a mechanical bond, thereby holding a roof membrane to the blend and/or roof surface during the polyurethane curing process.

The blend of the present invention can be used in the following non-limiting applications, namely:

A. A high strength interply adhesive for a built-up roof system as an alternative to the standard "hot mop" method.

B. An inline adhesive for the application of single ply membranes (i.e., white membranes, solar panels, etc.) on asphalt, modified asphalt, bitumen, modified bitumen, coal-tar, and/or modified coal tar roofing during manufacturing.

In one non-limiting aspect of the present invention, a hot melt polyurethane is combined with asphalt, modified asphalt, bitumen, modified bitumen, coal-tar, and/or modified coal tar to form the blend of the present invention. For purposes of this invention, term "petroleum liquid" will be hereinafter used to generically refer to all types of asphalt, modified asphalt, bitumen, modified bitumen, coal-tar, modified coal tar, or any mixture thereof, unless a specific type of asphalt, modified asphalt, bitumen, modified bitumen, coal-tar, or modified coal tar is referenced. In one non-limiting embodiment of the invention, the hot melt polyurethane is a one-component, moisture-curing polyurethane based on acrylate and/or methacrylate polymers or copolymers. In one non-limiting formulation of the invention, the moisture-curing polyurethane includes at least one reaction product with reactive isocyanate groups that are obtained by reaction of at least one di- or polyisocyanate with one or more polyether-polyols, partly crystalline or crystalline polyester-polyols and/or low molecular weight polymers from olefinically unsaturated monomers, and/or optionally tackifying resins. The monomeric di- or polyisocyanates suitable for the preparation of the hot melt polyurethane generally are those aromatic, aliphatic or cycloaliphatic diisocyanates having molecular weights of up to about 500; however, higher molecular weights can be used. Non-limiting examples of suitable aromatic diisocyanates include isomers of toluoylene diisocyanate (TDI), naphthalene 1,5-diisocyanate (NDI), naphthalene 1,4-diisocyanate (NDI), diphenylmethane 4,4'-diisocyanate (MDI), diphenylmethane 2,4'-diisocyanate and mixtures of 4,4'-diphenylmethane diisocyanate with the 2,4' isomer, xylylene diisocyanate (XDI), 4,4'-diphenyl-dimethylmethane diisocyanate, di- and tetraalkyl-diphenylmethane diisocyanates, 4,4'-dibenzyl diisocyanate, 1,3-phenylene diisocyanate and 1,4-phenylene diisocyanate. Non-limiting examples of cycloaliphatic diisocyanates include 4,4'-dicyclohexylmethane diisocyanate ($H_{12}$MDI), 1-isocyanatomethyl-3-isocyanato-1,5,5-trimethyl-cyclohexane (isophorone diisocyanate, IPDI), cyclohexane 1,4-diisocyanate, hydrogenated xylylene diisocyanate ($H_6$XDI), 1-methyl-2,4-diisocyanato-cyclohexane, m- or p-tetramethylxylene diisocyanate (m-TMXDI, pTMXDI) and dimer fatty acid diisocyanate. Non-limiting examples of aliphatic diisocyanates are tetramethoxybutane 1,4-diisocyanate, butane 1,4-diisocyanate, hexane 1,6-diisocyanate (HDI), 1,6-diisocyanato-2,2,4-trimethylhexane, 1,6-diisocyanato-2,4,4-trimethylhexane, lysine diisocyanate and 1,12-dodecane diisocyanate ($C_{12}$DI).y used. Non-limiting examples of polypropylene glycols or polybutylene glycols which can be used include di- and/or trifunctional polypropylene glycols with two or more hydroxyl groups per molecule in the molecular weight range from 400-20,000. Random and/or block copolymers of ethylene oxide and propylene oxide can also be employed. Another group of polyethers which can be used are polytetramethylene glycols (polybutylene glycols, poly(oxytetramethylene) glycol, poly-THF), wherein the molecular weight range of the polytetramethylene glycols are from 600-6,000. Instead of or additional to polyether-polyols, low molecular weight polyols, alkylene diols (e.g., butanediol, hexanediol, octanediol, decanediol, dodecanediol, etc.) can also be used. Non-limiting examples of polyester-polyols that can be used are the crystalline or partly crystalline polyester-polyols which can be prepared by condensation of di- or tricarboxylic acids (e.g., adipic acid, sebacic acid, glutaric acid, azelaic acid, suberic acid, undecanedioic acid, dodecandioic acid, 3,3-dimethylglutaric acid, terephthalic acid, isophthalic acid, hexahydrophthalic acid, etc.), dimer fatty acid with low molecular weight diols or triols (e.g., ethylene glycol, propylene glycol, diethylene glycol, triethylene glycol, dipropylene glycol, 1,4-butanediol, 1,6-hexanediol, 1,8-octanediol, 1,10-decanediol, 1,12-dodecanediol, dimer fatty alcohol, glycerol, trimethylolpropane, etc.). One non-limiting specific example of a hot melt polyurethane that can be used in the blend of the present invention includes at least about 2 weight percent of a diisocyanate, at least about 10 weight percent of a difunctional polypropylene glycol with a molecular weight of from about 1,000-8,000, at least about 0.5 weight percent of a polypropylene glycol or alkylene diol with a molecular weight from about 100-900, at least about 5 weight percent of a crystalline or partly crystalline polyester-polyol, at least about 2 weight percent of a low molecular weight polymer of olefinically unsaturated monomers, at least about 0.1 weight percent of a hydroxylated tackifying resin, and at least 0.005 weight percent of an acid stabilizer. Another non-limiting non-limiting specific example of a hot melt polyurethane that can be used in the blend of the present invention includes at least 5 weight percent of a diisocyanate, at least about 15 weight percent of a difunctional polypropylene glycol with a molecular weight of from about 1,500-7,000, at least about 1 weight percent of a polypropylene glycol or alkylene diol with a molecular weight from about 150-800, at least about 10 weight percent of a crystalline or partly crystalline polyester-polyol, at least about 5 weight percent of a low molecular weight polymer of olefinically unsaturated monomers, at least about 1 weight percent of a hydroxylated tackifying resin, and at least about 0.01 weight percent of an acid stabilizer. Still another non-limiting non-limiting specific example of a hot melt polyurethane that can be used in the blend of the present invention includes about 5-15 weight percent of a diisocyanate, about 20-40 weight percent of a difunctional polypropylene glycol with a molecular weight of from about 2,000-6,000, about 2-8 weight percent of a polypropylene glycol or alkylene diol with a molecular weight from about 200-600, about 15-30 weight percent of a crystalline or partly crystalline polyester-polyol, about 10-35 weight percent of a low molecular weight polymer of olefinically unsaturated monomers, about 2-8 weight percent of a hydroxylated tackifying resin, and about 0.01-0.1 weight percent of an acid stabilizer. Yet non-limiting specific example of a hot melt polyurethane that can be used in the blend of the present invention includes at least one reaction product with reactive NCO groups produced by reaction of i) about 5-15 weight percent of at least one di- or polyisocyanate; ii) about 20-40 weight percent difunctional polypropylene glycol having a molecular weight of from about 2,000 to 6,000; iii) about 15-30 weight percent of at least one crystalline or partly crystalline polyester-polyol; iv) about 10-35 weight percent of at least one low molecular weight polymer obtained by polymerization of one or more olefinically unsaturated monomers; v) about 2-8 weight percent of a polypropylene glycol or alkylene diol having a molecular weight of from about 200 to 600; and iv) about 2-8 weight percent of a tackifying resin. Still yet another non-limiting specific example of a hot melt polyurethane that can be used in the blend of the present invention includes i) a reactive, moisture-curable polyurethane adhesive; and ii) a catalytically effective amount comprising at least about 0.005 weight percent of at least one tertiary amine non-fugitive catalyst containing at least one active hydrogen, that provides at least one functional group that is capable of reacting with one or more isocyanate groups in a polyurethane prepolymer. In one non-limiting formulation of this embodiment, the hot melt polyurethane includes polyols. Still yet another non-limiting specific example of a hot melt polyurethane that can be used in the blend of the present invention is disclosed in U.S. Pat. Nos. 6,465,104; 6,635,722 and 7,300,996, all of which are incorporated herein.

In another and/or alternative non-limiting aspect of the present invention, the petroleum liquid that can be used in the blend of the present invention can have a wide range of softening points and penetrations. In one embodiment of the invention, the petroleum liquid has a penetration value of 2-30 and a softening point of about 130° F.-190° F. In another non-limiting embodiment of the invention, the petroleum liquid has a penetration value of 2-25 and a softening point of about 150° F.-180° F. In still another non-limiting embodiment of the invention, the petroleum liquid has a penetration value of 2-20 and a softening point of about 150° F.-170° F. In yet another non-limiting embodiment of the invention, the petroleum liquid has a penetration value of 12-20 and a softening point of about 155° F.-165° F.

In still another and/or alternative non-limiting aspect of the present invention, the blend of petroleum liquid with hot melt polyurethane can be used to form an interply adhesive for roofing materials and roofing systems. In one non-limiting embodiment, a reactive hot melt polyurethane can created using a variety of different polyol and diisocyanate combinations along with one or more additives, and that such reactive hot melt polyurethane can be tailor-made to produce very strong roofing products. The reactive hot melt polyurethane additives can be selected to impart one or more desirable properties to the blend of petroleum liquid with hot melt polyurethane such as tape-like tackiness, which would act as a mechanical clamp to hold the roof membranes together while the petroleum liquid-based polyurethane cured over time.

In still yet another and/or alternative non-limiting aspect of the present invention, the blend of petroleum liquid with hot melt polyurethane can be used in an inline manufacturing process to form roofing materials. In such a manufacturing process, the blend of the present invention can be applied to a roof membrane (i.e., white reflective membrane, solar panel, modified bitumen, etc.) and then mated with another roof membrane during the same manufacturing process to form a laminated roof membrane that could be shipped out to a customer.

Non-limiting examples of the invention are set forth below:

EXAMPLE 1

| | |
|---|---|
| Diisocyanate and/or polyisocynate | 5-50 wt % |
| Petroleum liquid | 5-80 wt % |
| Polyester-polyol, polypropylene glycol, polybutylene glycol, olefinically unsaturated monomers, and/or alkylene diols | 5-90 wt % |

EXAMPLE 2

| | |
|---|---|
| Diisocyanate and/or polyisocynate | 10-45 wt % |
| Petroleum Liquid | 5-70 wt % |
| Polyester-polyol, polypropylene glycol, polybutylene glycol, olefinically unsaturated monomers, and/or alkylene diols | 10-85 wt % |

EXAMPLE 3

| | |
|---|---|
| Acid stabilizer | up to 2 wt % |
| Diisocyanate and/or polyisocynate | 10-40 wt % |
| Petroleum Liquid | 5-65 wt % |
| Catalyst | up to 5 wt % |
| Polyester-polyol, polypropylene glycol, polybutylene glycol, olefinically unsaturated monomers, and/or alkylene diols | 15-85 wt % |
| Tackifying resin | up to 15 wt % |

EXAMPLE 4

| | |
|---|---|
| Acid stabilizer | up to 1 wt % |
| Aromatic diisocyanate and/or aromatic polyisocynate | 10-35 wt % |
| Petroleum Liquid | 5-65 wt % |
| Catalyst | up to 3 wt % |
| Polyester-polyol, polypropylene glycol, polybutylene glycol, olefinically unsaturated monomers, and/or alkylene diols | 10-85 wt % |
| Tackifying resin | up to 10 wt % |

EXAMPLE 5

| | |
|---|---|
| Acid stabilizer | up to 1 wt % |
| Catalyst | up to 3 wt % |
| Propylene Glycol (500-3000 MW) | 15-80 wt. % |
| Polyester Polyol | 10-30 wt. % |
| MDI | 15-30 wt. % |
| Type I-III Asphalt | 5-60 wt. % |
| Tackifying resin | up to 10 wt % |

EXAMPLE 6

| | |
|---|---|
| Acid stabilizer | up to 0.8 wt % |
| Catalyst | up to 2 wt % |
| Propylene Glycol (800-1200 MW) | 20-30 wt. % |
| Propylene Glycol (1800-2400 MW) | 20-30 wt. % |
| Polyester Polyol | 15-25 wt. % |
| MDI | 10-20 wt % |
| Type I-III Asphalt | 5-35 wt. % |
| Tackifying resin | up to 8 wt % |

EXAMPLE 7

| | |
|---|---|
| Acid stabilizer | 0.005-0.5 wt % |
| Catalyst | 0.005-1.5 wt % |
| Propylene Glycol (800-1200 MW) | 22-27 wt. % |
| Propylene Glycol (1800-2400 MW) | 22-27 wt. % |
| Polyester Polyol | 20-23 wt. % |
| MDI | 15-18 wt % |
| Type III Asphalt | 5-21 wt. % |
| Tackifying resin | 0.1-8 wt % |

EXAMPLE 8

| | |
|---|---|
| Acid stabilizer | 0.01-0.4 wt % |
| Catalyst | 0.005-1 wt % |
| Propylene Glycol (800-1200 MW) | 10-25 wt. % |
| Propylene Glycol (1800-2400 MW) | 10-25 wt. % |
| Polyester Polyol | 10-20 wt. % |
| Acrylic Copolymer | 10-25 wt. % |
| MDI | 10-20 wt % |
| Type I-III Asphalt | 5-50 wt. % |
| Tackifying resin | 0.1-6 wt % |

EXAMPLE 9

| | |
|---|---|
| Acid stabilizer | 0.01-0.2 wt % |
| Catalyst | 0.005-0.5 wt % |
| Propylene Glycol (800-1200 MW) | 15-20 wt. % |
| Propylene Glycol (1800-2400 MW) | 15-20 wt. % |
| Polyester Polyol | 12-27 wt. % |
| Acrylic Copolymer | 15-20 wt. % |
| MDI | 15-18 wt % |
| Type III Asphalt | 5-28 wt. % |
| Tackifying resin | 0.2-6 wt % |

EXAMPLE 10

| | |
|---|---|
| Acid stabilizer | up to 5 wt % |
| Catalyst | up to 10 wt % |
| Diisocyanate and/or polyisocynate | at least 5 wt % |
| Petroleum Liquid | at least 5 wt % |
| Polyester-polyol, polypropylene glycol, polybutylene glycol, olefinically unsaturated monomers, and/or alkylene diols | at least 5 wt % |
| Acrylic Copolymer | up to 30 wt. % |
| Tackifying resin | up to 20 wt % |

EXAMPLE 11

| | |
|---|---|
| Acid stabilizer | up to 4 wt % |
| Catalyst | up to 6 wt % |
| Diisocyanate and/or polyisocynate | 5-50 wt % |

| | |
|---|---|
| Petroleum Liquid | 5-80 wt % |
| Polyester-polyol, polypropylene glycol, polybutylene glycol, olefinically unsaturated monomers, and/or alkylene diols | 5-90 wt % |
| Acrylic Copolymer | up to 25 wt. % |
| Tackifying resin | up to 15 wt % |

In the examples above, Examples 1 and 2 illustrate the reactive polyurethane hot melt of the present invention includes three principal components, namely 1) diisocyanate and/or polyisocynate, 2) petroleum liquid, and 3) polyester-polyol, polypropylene glycol, polybutylene glycol, olefinically unsaturated monomers, and/or alkylene diols. As illustrated in Examples 3-9, the reactive polyurethane hot melt of the present invention generally also includes one or more of the following components, namely a) acid stabilizer, b) catalyst, and/or c) tackifying resin. As illustrated in Examples 5-9, the third principal component of the reactive polyurethane hot melt of the present invention is generally formed of two or more different compounds, namely two or more compounds selected from the group of polyester-polyol, polypropylene glycol, polybutylene glycol, olefinically unsaturated monomers, and/or alkylene diols. As illustrated in Examples 8 and 9, the reactive polyurethane hot melt of the present invention is generally includes an acrylic copolymer. Examples 10 and 11 illustrated two of the broader aspects of the present invention. As illustrated in Examples 6-9, the weight percent of the second principal component of the reactive polyurethane hot melt of the present invention is generally less than the weight percent of the third principal component of the reactive polyurethane hot melt of the present invention. When the weight percent of the second principal component is less than the weight percent of the third principal component, the weight ratio the second principal component to the third principal component is generally about 0.06-0.98:1, typically about 0.07-0.8:1, more typically about 0.1-0.7:1, and even more typically about 0.2-0.6:1. As also illustrated in Examples 6-9, the weight percent of the first principal component of the reactive polyurethane hot melt of the present invention is generally less than the weight percent of the third principal component of the reactive polyurethane hot melt of the present invention. When the weight percent of the first principal component is less than the weight percent of the third principal component, the weight ratio the first principal component to the third principal component is generally about 0.08-0.9:1, typically about 0.1-0.75:1, more typically about 0.12-0.65:1, and even more typically about 0.15-0.5:1. In one specific composition of reactive polyurethane hot melt of the present invention, the weight percent of the third principal component is greater than the combined weigh percent of the first and second principal components; however, this is not required.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

I claim:

1. A hot melt adhesive that includes a blend of three primary components, a first primary component is an isocyanate compound, a second primary component is petroleum liquid, a third primary component is polyol compound, said petroleum liquid selected from the group consisting of asphalt, modified asphalt, bitumen, modified bitumen, coal-tar, modified coal tar, or mixtures thereof, said isocyanate compound including one or more compounds selected from the group consisting of diisocyanate and polyisocyanate, said polyol compound including one or more compounds selected from the group consisting of polyester-polyol, polypropylene glycol, polybutylene glycol, olefinically unsaturated monomers, and alkylene diols, said polyol compound having a weight percent that is greater than a combined weight percent of said petroleum liquid and said isocyanate compound, said hot melt adhesive including one or more compounds selected form the group consisting of an acid stabilizer, a catalyst, and a tackifying agent, said hot melt adhesive comprising:

| | |
|---|---|
| Acid stabilizer | 0.005-0.5 wt % |
| Catalyst | 0.005-1.5 wt % |
| Propylene Glycol (800-1200 MW) | 22-27 wt % |
| Propylene Glycol (1800-2400 MW) | 22-27 wt % |
| Polyester Polyol | 20-23 wt % |
| MDI | 15-18 wt % |
| Type III Asphalt | 5-21 wt % |
| Tackifying resin | 0.1-8 wt %. |

2. The hot melt adhesive as defined in claim 1, wherein a weight ratio of said petroleum liquid to said polyol compound is about 0.06-0.98:1.

3. The hot melt adhesive as defined in claim 2, wherein a weight ratio of said petroleum liquid to said polyol compound is up to about 0.7:1.

4. The hot melt adhesive as defined in claim 3, wherein a weight ratio of said petroleum liquid to said polyol compound is up to about 0.6:1.

5. The hot melt adhesive as defined in claim 1, wherein a weight ratio of said isocyanate compound to said polyol compound is about 0.08-0.9:1.

6. The hot melt adhesive as defined in claim 5, wherein a weight ratio of said isocyanate compound to said polyol compound is up to about 0.65:1.

7. The hot melt adhesive as defined in claim 6, wherein a weight ratio of said isocyanate compound to said polyol compound is up to about 0.5:1.

8. The hot melt adhesive as defined in claim 4, wherein a weight ratio of said isocyanate compound to said polyol compound is up to about 0.5:1.

9. The hot melt adhesive as defined in claim 1, comprising:

| | |
|---|---|
| Acid stabilizer | 0.01-0.4 wt % |
| Catalyst | 0.005-1 wt % |
| Propylene Glycol (800-1200 MW) | 10-25 wt % |
| Propylene Glycol (1800-2400 MW) | 10-25 wt % |
| Polyester Polyol | 10-20 wt % |
| Acrylic Copolymer | 10-25 wt % |
| MDI | 10-20 wt % |

-continued

| | |
|---|---|
| Type I-III Asphalt | 5-50 wt % |
| Tackifying resin | 0.1-6 wt %. |

10. The hot melt adhesive as defined in claim 8, comprising:

| | |
|---|---|
| Acid stabilizer | 0.01-0.4 wt % |
| Catalyst | 0.005-1 wt % |
| Propylene Glycol (800-1200 MW) | 10-25 wt % |
| Propylene Glycol (1800-2400 MW) | 10-25 wt % |
| Polyester Polyol | 10-20 wt % |
| Acrylic Copolymer | 10-25 wt % |
| MDI | 10-20 wt % |
| Type I-III Asphalt | 5-50 wt % |
| Tackifying resin | 0.1-6 wt %. |

11. The hot melt adhesive as defined in claim 1, comprising:

| | |
|---|---|
| Acid stabilizer | 0.01-0.2 wt % |
| Catalyst | 0.005-0.5 wt % |
| Propylene Glycol (800-1200 MW) | 15-20 wt % |
| Propylene Glycol (1800-2400 MW) | 15-20 wt % |
| Polyester Polyol | 12-27 wt % |
| Acrylic Copolymer | 15-20 wt % |
| MDI | 15-18 wt % |
| Type III Asphalt | 5-28 wt % |
| Tackifying resin | 0.2-6 wt %. |

12. The hot melt adhesive as defined in claim 8, comprising:

| | |
|---|---|
| Acid stabilizer | 0.01-0.2 wt % |
| Catalyst | 0.005-0.5 wt % |
| Propylene Glycol (800-1200 MW) | 15-20 wt % |
| Propylene Glycol (1800-2400 MW) | 15-20 wt % |
| Polyester Polyol | 12-27 wt % |
| Acrylic Copolymer | 15-20 wt % |
| MDI | 15-18 wt % |
| Type III Asphalt | 5-28 wt % |
| Tackifying resin | 0.2-6 wt %. |

* * * * *